(12) United States Patent
Probst et al.

(10) Patent No.: US 6,209,399 B1
(45) Date of Patent: Apr. 3, 2001

(54) PRESSURE SENSOR UNIT, ESPECIALLY FOR AUTOMOTIVE ENGINEERING APPLICATIONS

(75) Inventors: Uwe Probst, Orsingen-Nenzingen; Robert Skolfljanec, Moos-Bankholzen, both of (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/230,705
(22) PCT Filed: May 5, 1998
(86) PCT No.: PCT/DE98/01259
  § 371 Date: May 27, 1999
  § 102(e) Date: May 27, 1999
(87) PCT Pub. No.: WO98/55845
  PCT Pub. Date: Dec. 10, 1998

(30) Foreign Application Priority Data

Jun. 5, 1997 (DE) .............................................. 197 23 615

(51) Int. Cl.$^7$ ....................................................... G01L 7/00
(52) U.S. Cl. ................................................................ 73/756
(58) Field of Search .............................. 73/706, 715, 716, 73/717, 723, 756, 431, 1.57

(56) References Cited

U.S. PATENT DOCUMENTS 4,170,895 * 10/1979 Kliger ................................... 73/64.3
4,386,453 * 6/1983 Giachino et al. ................... 29/25.41
4,649,754 * 3/1987 Zacharias .......................... 73/861.18
5,060,525 * 10/1991 Häfner .............................. 73/862.54

* cited by examiner

Primary Examiner—William Oen
(74) Attorney, Agent, or Firm—Fay, Sharpe, Fagan, Minnich & McKee, LLP

(57) ABSTRACT

A pressure sensor suitable for use in automotive applications is provided to sense the pressure of a pressurized fluid medium and generate an electrical signal representative of the sensed pressure on a set of electrical contact members. A main housing body has a fluid supply opening adapted to conduct a pressurized fluid medium into the housing body. A pressure measuring cell is provided including a plastic measuring cell housing and an electric pressure sensor arranged on the plastic measuring cell housing. The pressure measuring cell is disposed on the housing body of the pressure sensor apparatus adjacent the fluid supply opening so that at least part of the electric pressure sensor is acted upon by the pressurized fluid medium. A reinforcement plate member is adapted to engage a back side of the pressure measuring cell to hold the pressure measuring cell in place relative to the main housing body against the pressure of the pressurized fluid medium. At least two electrical conductors are integrally molded into the plastic measuring cell housing and extend completely through the plastic measuring cell housing and through the reinforcement plate member to form first and second sets of electrical contacts on opposite high and low pressure sides of the plastic measuring cell housing to enable electrical connection to the electric pressure sensor disposed in the main housing body.

19 Claims, 3 Drawing Sheets

PRESSURE SENSOR UNIT, ESPECIALLY FOR AUTOMOTIVE ENGINEERING APPLICATIONS

BACKGROUND OF THE INVENTION

The subject invention is directed to the pressure sensor arts and, more particularly, to pressure sensor apparatus suited for use in automotive applications to sense the pressure of a pressurized fluid medium and generate electrical signals representative of the sensed pressure.

Pressure sensors of the type under consideration are well known in the automotive engineering community. A multiplicity of designs have been used in automotive applications such as, for example, as sensor elements for monitoring the oil pressure of an engine or to monitor brake pressure, or the like.

Generally, pressure sensor units typically comprise a housing having an inlet opening adapted to receive a small quantity of the pressurized fluid medium intended to be monitored. Typically, the pressurized fluid medium is conducted into the housing via the inlet opening towards a pressure measuring cell located within the housing. Many pressure sensor housings are provided with external threading so that the housing can be screwed into place on an engine block or brake cylinder having corresponding intermateable threads.

On important consideration in pressure sensors used for automotive applications is their long-term stability and resistance to aggressive media as well as survivability in rough environmental conditions. One proposed solution to protect the pressure sensors from aggressive fluids that may cause damage has been to provide a barrier between the pressure sensor and the fluid. Sensors of this type are known in the art as "media-separated" pressure sensor units. There, the monitored pressurized fluid medium does not come into actual direct contact with the sensor element itself but, rather, acts indirectly upon the pressure sensing device through an intermediary separation membrane. In these designs, the sensitive sensor element disposed within the housing is typically arranged in a measuring cell housing which is in turn protected from aggressive fluid medium by means of the above-noted separation membrane. An interstitial pressure transfer medium is often used to transfer the pressure generated by the fluid medium to be monitored to the sensor element. Normally, the pressure transfer medium occupies the void between the separation membrane and the sensor element proper. Pressure sensor units of this type are well known in the art and are described in the literature including German Patent DE 295 11 996 U1.

One disadvantage of media-separated pressure sensor units, however, is that it is often difficult and costly to install the pressure measuring cell into the housing. Typically, the pressure measuring cell comprises one or more housing components and a fragile sensor element arranged therein. Major contributors to the difficulty and expense in fabricating the media-separated pressure sensor units include the step of installing the pressure sensor element on one or more appropriate support elements and further, the step of establishing electrical and mechanical connections to the sensor element.

Inasmuch as all sensor elements must be positioned in a manner to enable the measured fluid to act upon the sensor element, it is necessary to route the electrical pressure sensor connectors on a side of the support element facing away from the pressurized fluid medium. Typically, the electrical connections are not routed toward the pressurized medium. Normally also, in order to absorb and transfer the high pressure forces generated by the pressurized fluid medium to the housing, the support elements are usually formed of metal. Accordingly, routing the electrical connections on a side of the support element facing away from the pressurized fluid medium is difficult. It is well known that metal support elements conduct electricity. Therefore, in pressure sensors that use metal support elements, it is necessary to extend the sensor electrical connection contacts in an isolated fashion through the metal support element on a side opposite the pressurized fluid medium. An example is shown in DE 295 11 976 U1. The complexity of the electrical connections in pressure sensors of this type is commensurate with the expense thereof.

A alternative pressure sensor is described in German patent application DE 196 37 763 wherein a pressure sensor unit includes a measuring cell having a measuring cell housing retained in the main housing of the pressure sensor unit. In that example, the measuring cell housing is provided with a central breakout portion whereat a pressure sensor element is installed from a rear side of the breakout portion. The pressure sensor element is located in a TO-type housing. The TO-type housing is tightly joined with the measuring cell by means of welding. It is an advantage of the above-described construction that the sensor element proper can be pre-installed in the measuring cell housing and joined thereto before the pressure sensor unit itself is constructed. In contrast to prior known sensor units, this results in the benefit of a less complicated installation. One expense that remains, however, is a result of the need to install the sensor element proper into the TO-type housing. Further, an additional expense drawback is the requirement for the firm and tight joining of the TO-type housing to the measuring cell housing.

It is desirable, therefore, to provide a pressure sensor that is able to withstand aggressive fluid media and rough environmental conditions while being simple and relatively inexpensive to construct.

SUMMARY OF THE INVENTION

The subject invention provides a pressure sensor apparatus that is particularly well suited for use in automotive applications and which can be manufactured with little expense and is thus cost-effective. The pressure sensor apparatus of the invention is adapted to sense the pressure of a pressurized fluid medium and generate an electrical signal representative of the sensed pressure on a set of electrical contact members. A housing member is provided including a fluid supply opening adapted to conduct a pressurized fluid medium into the housing member. A pressure measuring cell includes a plastic measuring cell housing and an electric pressure sensor arranged on the plastic measuring cell housing. The pressure measuring cell is disposed in the housing body adjacent the fluid supply opening so that at least a part of the electric pressure sensor is acted upon by the pressurized fluid medium. A reinforcement plate member adapted to engage a first side of the pressure measuring cell holds the pressure measuring cell in place relative to the housing body against the pressure of the pressurized fluid medium. At least two electrical conductors are molded integrally with and into the plastic measuring cell housing. The at least two electrical conductors extend completely through the plastic measuring cell housing and through the reinforcement plate member to form a first and second set of electrical contacts. The first set of electrical contacts are adjacent the first side of the plastic measuring cell and are operatively connected to the set of electrical contact members provided on the pressure sensor apparatus. The second set of electrical contacts are disposed upon a second side of a plastic measuring cell housing opposite the first side and are operatively connected to the electric pressure sensor.

It is an advantage of the present invention that by injection-molding of the at least two electrical conductors integrally with and directly into the measuring cell housing, the costs associated with manufacturing the measuring cell or the pressure sensor unit overall is significantly reduced.

The sensor element proper, which is preferably formed on a semiconductor chip, is arranged directly on or in the measuring cell housing. The electrical connections to the pressure sensor are connected by bonding with electrical contact terminals which project from the side of the measuring cell housing which is acted upon by the pressurized fluid medium or the pressure transfer medium. In this fashion, the subject measuring cell can be produced in a simple manner and, further, is adapted to be easily and simply installed within the housing body of the pressure sensor unit. In a preferred embodiment of the invention, the electrical conductors are fashioned in the form of a punched-out grid or stamped parts, which is/are bent to the desired shaped prior to or during the extrusion molding process. Preferably, the punched-out grid electrical conductor is formed in such a manner that the respective contact terminals are connectable by means of bonding with corresponding contacts on the pressure sensor proper. In order to ensure good bonding, it is required that the connection contact terminals of the punched-out grids, or stamped leads, are polished or, at a minimum, include polished regions. Furthermore, during the entire manufacturing process of molding the pressure measuring cell, care must be taken that the bonding regions of the punched-out grids not become dirty. As a specific example, it is preferred that no separation medium is employed during the extrusion process. Therefore, in fabricating the pressure measuring cell of the instant application, it is preferred that steeper slopes be used or designed into the shape in order to facilitate the formation of the extruded pressure measuring cell component.

It is a further advantage of the present invention that the contact terminals of the electrical conductors which protrude from the side of the measuring cell housing facing away from the pressurized fluid medium simultaneously serve as mechanical mounting supports for electrical circuits such as, for example, electronic circuits that evaluate, analyze, or process the sensor signals. More particularly, the contact terminals on the side opposite the pressurized fluid medium are formed, in accordance with the present invention, to engage a corresponding set of connectors that form part of an electronic circuit or other electronic wiring within the housing body of the pressure sensor. The contact with the sensor terminals for electronic wiring or electronic circuits can be made in many ways but, preferably, include element-conforming inserts or cutting-type contacts which respectively cooperate with each other. More particularly, as a preferred example, insert or cutting-type contacts are provided at the electronic wiring or electronic circuit portion for electrical and mechanical engagement with a corresponding intermateable element conforming-type contacts at the pressure measuring cell.

It is a further advantage of the preferred embodiment of the invention that the pressure sensor comprises an integrated circuit chip which is glued onto an interior wall of a recess formed in the measuring cell housing. This results in an extremely simple construction of the pressure measuring cell. In accordance with another specific embodiment of the invention, for example, in order to produce extremely temperature-stable pressure sensor units, the pressure sensor is disposed on the surface of a rigid element provided at or inside the measuring cell housing. Preferably, the rigid element is made of a ceramic material. As a result, any tensions that may exist or form during manufacture or use within the measuring cell housing such as those produced by changes in the temperature, are not transmitted to the sensitive sensor element proper. Thus, measuring errors and destruction of the sensor element proper, are safely avoided.

In accordance with another advantage of the invention, a reinforcement plate is provided on the backside of the measuring cell housing. The reinforcement plate is preferably used when highly pressurized fluid medium is to be measured. The reinforcement plate preferably includes perforations for allowing the connection contacts to pass therethrough in a manner to be subsequently described. In addition, the reinforcement plate is alternatively injection molded into the measuring cell housing or extruded into same.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
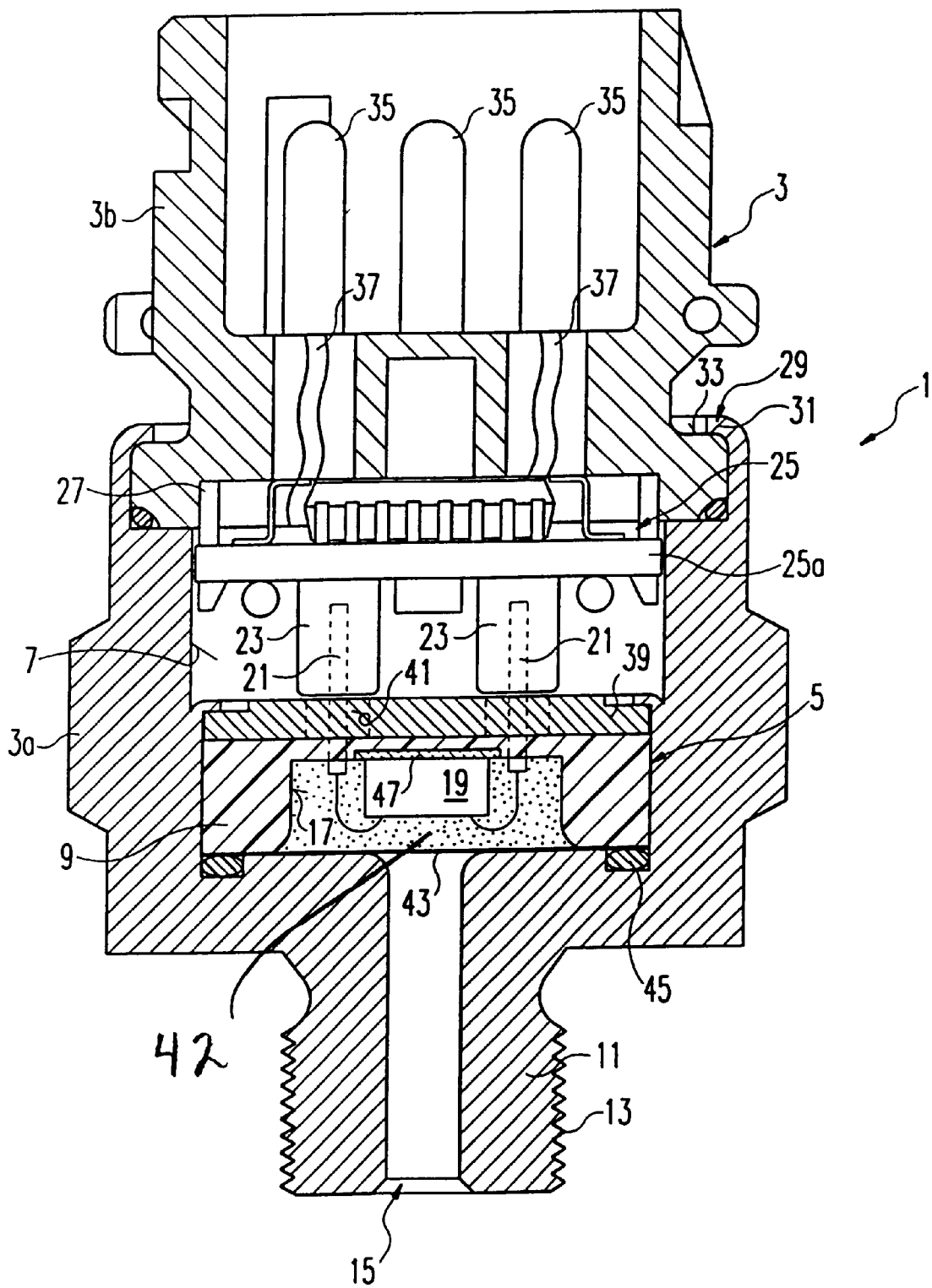
FIG. 1 is a cross-sectional view showing the overall arrangement of a high pressure sensor apparatus formed in accordance with the first preferred embodiment of the invention.

Referring now to the drawings wherein the showings are for the purposes of illustrating the preferred embodiments of the invention only and not for purposes of limiting same, the overall arrangement of the first preferred form of a pressure sensor apparatus formed in accordance with the invention can best be seen by reference to FIG. 1. As shown therein, the pressure sensor unit 1 consists of a two-piece main housing body 3 within which is disposed a pressure measuring cell 5. The housing body 3 is preferably formed of metal or high-strength plastic for reasons that will subsequently become apparent.

Generally, the pressure measuring cell 5 is mounted in the lower, first housing component 3a of the housing body as shown. A recess 7 is provided in the housing body for receiving the pressure measuring cell 5 and is preferably shaped in the form of a bore hole which has, in its lower portion, an inner diameter that essentially corresponds to the outer diameter of a measuring cell housing 9. Preferably, the measuring cell housing is disc-shaped although other suitable forms and shapes can be used.

A substantially circular-cylindrical extension 11 is formed on the lower region of the first housing component 3a and includes a threaded region 13 as shown. In that way, the pressure sensor unit 1 can be threaded into a corresponding threaded bore hole such as, for example, into a cylinder of an internal combustion system or engine block. A supply opening 15 enables the communication of a pressurized fluid medium into the housing body 3 through the extension or prolongation 11. In that way, the pressurized fluid medium is delivered and brought into contact with the pressure measuring cell 5 to act on the pressure measuring cell. As shown in the figure, the pressure measuring cell 5 is disposed within the housing body 3 adjacent the fluid supply opening 15 so that at least a part of an electric pressure sensor 19 is acted upon by the pressurized fluid medium that is communicated through the supply opening. The measuring cell housing 9 includes a central recess 17 that is adapted to receive the electric pressure sensor 19 as shown. Although the electric pressure sensor 19 can be formed in many ways, a preferred example includes a silicone membrane with integrated piezo-resistive semi-conductor resistors.

In accordance with the present invention, the measuring cell housing 9 is an injection-molded plastic component. Further in accordance with the invention, at least two electrical conductors 21 are molded directly into the plastic measuring cell housing 9 and are thereby formed integrally therewith. This results in the benefit that the electrical conductors 21 form a hermetically tight and electrically isolated seal through the measuring cell housing 9 on the side of the measuring cell housing facing away from, or opposite from, the pressure side adjacent the supply opening 15.

In accordance with the invention, the at least two electrical conductors are preferably formed as bent punched-out grids or bent stamped parts. As shown in the figure, the electrical conductors 21 are preferably fashioned on their respective upper ends as cutting contacts that extend from the measuring cell housing in an orientation so as to interact directly with terminal lugs 23 associated with an electronic wiring 25. The electronic wiring 25 is represented in the preferred embodiment as being disposed in the upper, second housing component 3b of housing body 3. To that end, a plate portion 25a of an electronic circuit 25 is equipped with lateral recesses that are adapted to engage a corresponding set of grip retainer arms 23 which are joined to the upper housing component 3b of the housing body 3. With the above construction, the electrical connection between the terminal lugs 23 of the electronic circuit 25 and the respective contact ends of the electrical conductors or punched-out grids 21 is accomplished simply by inserting the upper housing member 3b into the lower housing member 3a.

For the above purpose, the lower housing component 3a is provided with a coupling region 29 with a shoulder that acts as a stop for the front side of the upper housing component 3b. An upper housing wall 31 is adapted to be bent over into engagement with a shoulder region 33 formed on the underside of the upper housing component 3b. The upper housing wall 31 can be crimped or otherwise bent into the position shown in FIG. 1 subsequent to intermateable engagement between the upper and lower housing members 3b, 3a. In that way, after pushing together the two housing components 3a, 3b a firm connection is formed therebetween.

With continued reference to FIG. 1, the upper housing component 3b is provided with an insertion connection zone including exterior connection contacts 35. The exterior electrical contacts 35 enable the subject pressure sensor unit 1 to be connected to an associated electric circuit (not shown) via a suitably configured insertion plug (not shown). Preferably, the connection contacts 35 are connected by means of electrical connection lines 37 with the electronic circuit 25 disposed in the upper housing component 3b. Alternatively, intermateable insertion-plug type connections can also be employed in order to establish electrical contact between the exterior connection contacts 35 and the electronic wiring 25.

In the first preferred embodiment of the invention shown in FIG. 1, the measuring cell housing 9 includes a reinforcement element 39 adapted to engage a first side of the pressure measuring cell 5 and hold the pressure measuring cell in place relative to the housing body 3 against the pressure of the pressurized fluid medium contained in the supply opening 15. As shown, the reinforcement element 39 is disposed on the posterior side facing away from the pressurized fluid medium. Preferably, the reinforcement element 39 comprises a metal plate which includes a pair of perforations 41 through which pass the contact ends of the electrical conductors or of the punched-out grids 21. In accordance with the invention, the reinforcement element 39 is superposed as a loose disc onto the plastic extrusion component of the measuring cell housing 9 during installation of the pressure sensor unit. Alternatively, it is extruded into the plastic injection molded piece. Still further yet, it is alternatively injection molded into the measuring cell housing.

Turning now to the fabrication of the subject pressure sensor apparatus, the pressure measuring cell 5 is installed within the housing body 3 by first filling the recess 17 with a pressure transmission medium 42 since the exemplary embodiment represented in FIG. 1 involves a media-separated pressure sensor unit. After the recess 17 is filled with the pressure transmission medium 42, the measuring cell housing 9 is inserted together with a separation membrane 43 into the recess 7 of the lower housing component 3a. A sealing ring 45 is disposed in a circumferential groove so that, by pressing the measuring cell housing 9 against the bottom side of the recess 7, a tight seal is formed so that the pressure transmission medium 42 is unable to escape from the space formed by the recess 17 and the separation membrane 43.

As represented in FIG. 1, the measuring cell is fastened into place in the position shown by means of a peeling process of one or more regions or a continuous circumferential region of the lateral interior wall of the recess 17. Preferably, the one or more regions are peeled and bent inwardly to grab behind the measuring cell housing. In this way, it is possible through the installation process to generate a corresponding pressure on the measuring cell housing 9 so that the measuring cell housing is essentially retained in place subsequent to the peeling process. Alternatively, rather than using a peeling process, the measuring cell housing 9 can also be fastened by tapering the housing component 3a which is preferably made of metal. To that end, the lower housing component 3a could alternatively be radially squeezed above the upper end of the inserted measuring cell housing thereby holding the measuring cell housing in place as the outer walls of the lower housing component 3a are swaged inwardly.

As is apparent from FIG. 1, the pressure sensor 19 is disposed on the interior wall of the groove 17 in the measuring cell housing 9 using a de-coupling element 47 which, preferably, is formed from a small ceramic plate. The small ceramic de-coupling element 47 is preferably glued onto the interior side of the recess 17. Alternatively, the ceramic plate 47 is injected molded together with the plastic injection molding component of the measuring cell housing 9. By using the de-coupling element, transmission of tensions, stresses, and strains to the sensitive sensor 19 is prevented. The tensions may be caused, for example, by changes in temperature or may occur during the installation process of the measuring cell housing 9 into the housing body 3. For certain applications, the de-coupling element 47 need not be used. As an example, the de-coupling element may be waived through utilization of appropriate plastics or mixed materials in the measuring cell 9.

From the above, it is apparent that the pressure sensor shown in FIG. 1 is specifically adapted for measuring high pressures. However, the exemplary embodiment presented in FIG. 2 is more particularly adapted for use with lower and medium pressure fluid mediums.

Figure 2:
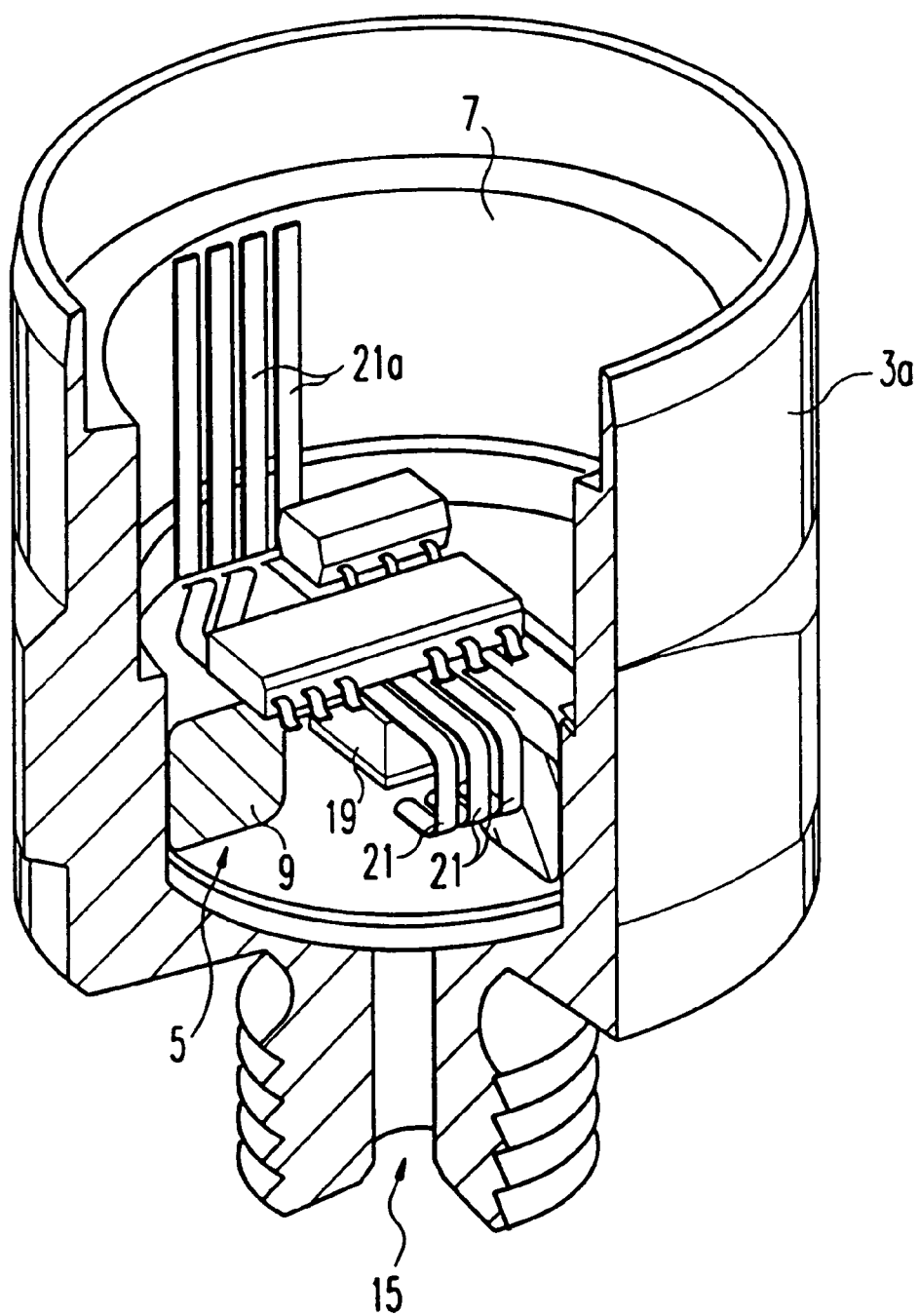
FIG. 2 is a perspective view of a lower housing portion of a medium and low pressure sensor apparatus in partial cross-section formed in accordance with a second preferred embodiment of the invention; and, FIG. 3 is a cross-sectional view showing the overall arrangement of a low to medium pressure sensor apparatus formed in accordance with a third preferred embodiment of the invention.

Turning now to FIG. 2, only the lower housing component 3a of the housing body 3 is shown in a partially sectioned perspective view. As shown there, a measuring cell 5 is installed on the bottom of the recess 7 of the lower housing component 3a. The measuring cell 5 basically corresponds to the measuring cell depicted in connection with FIG. 1. With respect to the embodiment shown in FIG. 2, however, the reinforcement plate 39 described above in connection with FIG. 1 need not be used because, as indicated above, the device shown in FIG. 2 is adapted for low and medium pressure monitoring.

Preferably, the measuring cell housing 9 consists of a plastic extrusion component into which are extruded electrical conductors 21. In the specific embodiment shown in FIG. 2, the electrical conductors 21 are shaped as punched-out grids and, as such, are designed in a manner that they emerge on the pressure-distal side of the measuring cell housing 9 in such a fashion that the measuring cell housing 9 simultaneously functions as an electrical conductor plate. An advantage of the design of the electrical conductors 21 shown in FIG. 2 is that it is possible to weld electronic building components, such as, for example, integrated circuits, particularly ASICs, directly onto the electrical conductors 21. As shown in the figure, a surface-mounted integrated circuit is welded onto the electrical conductors.

Contacting of the electronic building components of the outer connection contacts arranged in the upper housing component (not shown) is enabled by means of contact connection terminals 21a which extend vertically from the measuring cell housing 9 in the direction of the upper housing component. In order to make contact with the terminals 21a, a corresponding set of counter-contacts are preferably formed in the upper housing component and oriented in a downward direction. It is to be noted, however, that the arrangement of the electronic circuits, the electronic wiring, contacting of the sensor 19, or of the outer connection contacts 35 discussed above in connection with the embodiment shown in FIG. 1, can also be used as needed or desired in the embodiment represented in FIG. 2.

Figure 3:
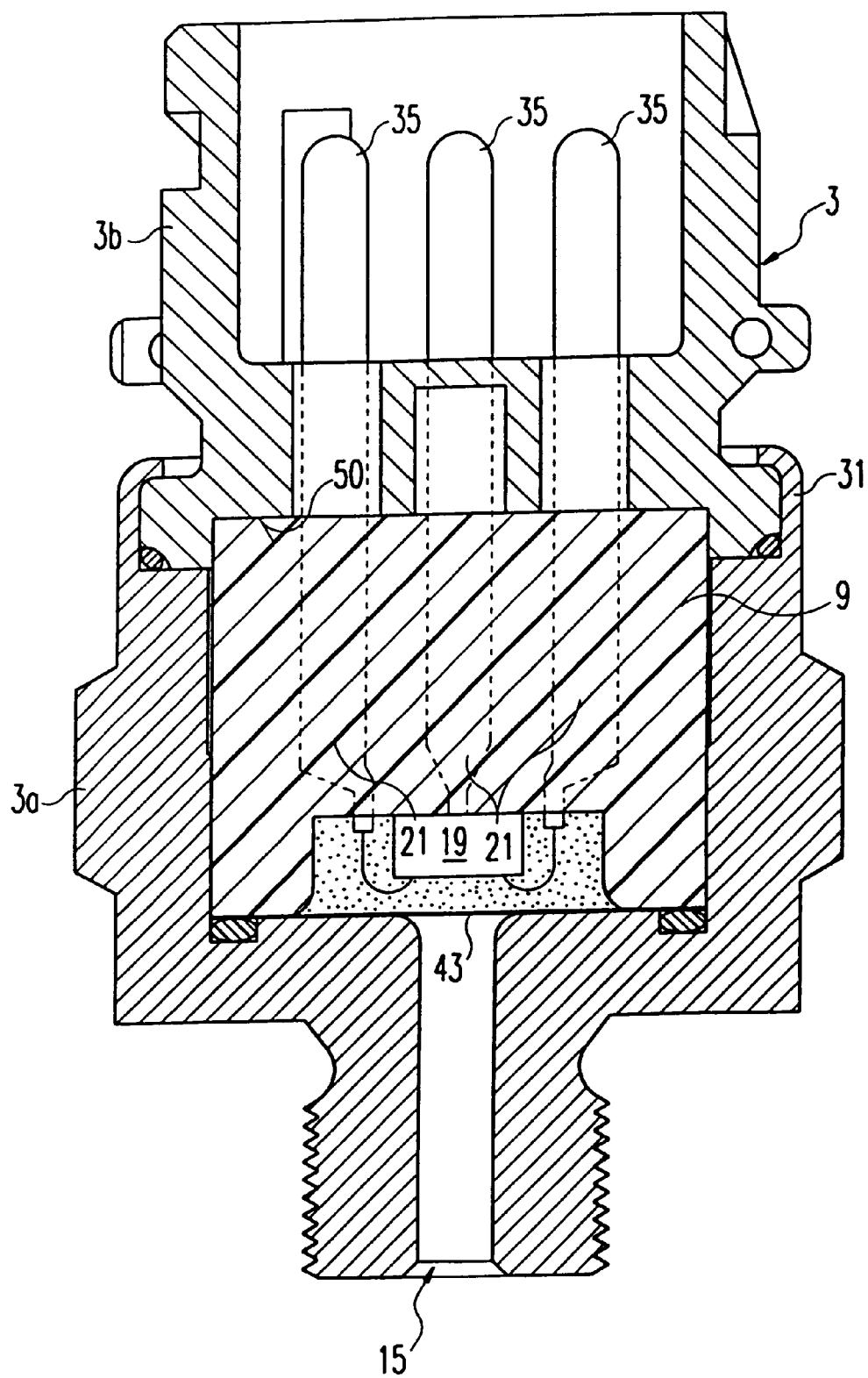

Turning lastly to FIG. 3, a third preferred embodiment of the subject invention is illustrated in cross-section. This embodiment is preferably suitable for use with low and medium pressure fluids where the pressure measuring cell housing 9 is acted upon by a radially inwardly extending shoulder 50 of the upper housing component 3b. The two housing components 3a, 3b are connected simply by crimping a wall member 31 of the lower housing component 3a inwardly after the two housing components 3a, 3b are brought into contact. The measuring cell 5 is fastened within the housing after the two housing components are brought into contact and the crimping wall 31 is bent over. This simple procedure enables a reduced manufacturing and assembly cost to the subject pressure sensor apparatus. The entire required electronics can be integrated into the sensor 19 or, signal evaluation can take place outside the sensor unit. The conductors 21 extruded into the measuring cell housing 9 can therefore be designated in a single piece with connection contacts 35 or the ends of conductors 25 can exit from the surface of the measuring cell housing 9 as connection contacts 35. To thus form the conductors 21 integral with the connection contacts 35 results in a further reduction of the manufacturing and assembly costs.

Still further, if additional electrical or electronic building components are needed, the connection contacts 35 can also be extruded into the measuring cell housing 9 and serve, concurrently, the same as conductors 21, as mechanical supports for building elements.

In addition to the above, the upper housing component 3b can also be formed as a single piece with measuring cell housing 9, so that for assembly of the sensor unit only two parts need to be installed, not counting the pressure sensor 19. Therefore, as a result of the utilization of a plastic extrusion component, at least as an essential element of the measuring cell housing 9, into which electrical contacts for establishing contact with the pressure sensor 19, a definite simplification is achieved with respect to the manufacture of the pressure measuring cell, as well as its installation into the housing body of the pressure sensor unit.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. A pressure sensor unit comprising:
    a housing in which is arranged a pressure measuring cell, a supply opening for directing a pressure medium, and exterior connection contacts leading from the interior of the housing toward the outside, the pressure measuring cell including a measuring cell housing in which is arranged a pressure sensor which is acted upon by a pressure medium;
    the electrical contacts of the pressure sensor being connected with a one of the exterior connection contacts and the connections of an electronic circuit;
    the measuring cell housing including a plastic extrusion component into which have been injected at least two electrical conductors, whereby the electrical conductors respectively protrude with at least one first contact end into a region for acceptance of the pressure sensor and are respectively connected with an electrical connection of the pressure sensor;
    the electrical conductors protruding with respectively at least one second contact end into a region of the measuring cell housing not acted upon by the pressure medium and which is connected with the exterior connection contacts or the connections of the electronic circuit, and
    a reinforcement plate, fastened in housing supporting a back side of said measuring cell housing.

2. A pressure sensor apparatus to sense the pressure of a pressurized fluid medium and generate an electrical signal representative of the sensed pressure on a set of electrical contact members, the pressure sensor apparatus comprising:
    a housing body including a fluid supply opening adapted to conduct a pressurized fluid medium into the housing body;

a pressure measuring cell including a plastic measuring cell housing and an electric pressure sensor arranged on the plastic measuring cell housing, the pressure measuring cell being disposed on the housing body adjacent the fluid supply opening so that at least part of the electric pressure sensor is acted upon by said pressurized fluid medium;

a reinforcement plate member adapted to engage a first side of the pressure measuring cell and hold the pressure measuring cell in place relative to the housing body against said pressure of the pressurized fluid medium; and, at least two electrical conductors molded into the plastic measuring cell housing, the at least two electrical conductors extending completely through the plastic measuring cell housing and through said reinforcement plate member to form, adjacent to said first side of the plastic measuring cell, a first set of electrical contacts operatively connected to said set of electrical contact members and to form, on a second side of the plastic measuring cell housing opposite said first side, a second set of electrical contacts operatively connected to said electric pressure sensor.

3. The pressure sensor apparatus according to claim 2 wherein said at least two electrical conductors comprise punched out grids.

4. The pressure sensor apparatus according to claim 3 wherein said electric pressure sensor includes a semi-conductor chip.

5. The pressure sensor apparatus according to claim 4 wherein said semi-conductor chip includes electronics adapted to perform processing and evaluation.

6. The pressure sensor apparatus according to claim 2 wherein said second set of electrical contacts formed by the at least two electrical conductors are bonded to said electric pressure sensor.

7. The pressure sensor apparatus according to claim 2 wherein said second set of electrical contacts formed by the at least two electrical conductors are adapted to mechanically support an associated electronic circuit within said housing body.

8. The pressure sensor apparatus according to claim 7 wherein:

said associated electronic circuit includes a connector member; and, said second set of electrical contacts formed by the at least two electrical conductors include an insertion end adapted to engage the connector member of the associated electronic circuit.

9. The pressure sensor apparatus according to claim 2 wherein said electric pressure sensor is glued directly onto a wall of said plastic measuring cell housing.

10. The pressure sensor apparatus according to claim 2 further comprising a decoupling member disposed between the electric pressure sensor and said plastic measuring cell housing.

11. The pressure sensor apparatus according to claim 10 wherein said decoupling member is molded into the plastic measuring cell housing.

12. The pressure sensor apparatus according to claim 2 wherein said reinforcement plate member is molded into the plastic measuring cell housing.

13. A pressure measuring cell for use in a pressure sensor apparatus to sense the pressure of a pressurized fluid medium and generate an electrical signal representative of the sensed pressure on a set of electrical contact members arranged on a main a housing body of the pressure sensor apparatus, the main a housing body including a fluid supply opening adapted to conduct a pressurized fluid medium into the housing body, the pressure measuring cell comprising:

a plastic measuring cell housing;

an electric pressure sensor arranged on the plastic measuring cell housing, the pressure measuring cell being disposed on the housing body adjacent the fluid supply opening so that at least part of the electric pressure sensor is acted upon by said pressurized fluid medium;

a reinforcement plate member adapted to engage a first side of the pressure measuring cell and hold the pressure measuring cell in place relative to the housing body against said pressure of the pressurized fluid medium; and, at least two electrical conductors molded into the plastic measuring cell housing, the at least two electrical conductors extending completely through the plastic measuring cell housing and through said reinforcement plate member to form, adjacent to said first side of the plastic measuring cell, a first set of electrical contacts operatively connected to said set of electrical contact members and to form, on a second side of the plastic measuring cell housing opposite said first side, a second set of electrical contacts operatively connected to said electric pressure sensor.

14. The pressure measuring cell according to claim 13 wherein said at least two electrical conductors comprise punched out grids.

15. The pressure measuring cell according to claim 14 wherein said electric pressure sensor includes a semi-conductor chip.

16. The pressure measuring cell according to claim 13 wherein said electric pressure sensor is glued directly onto a wall of said plastic measuring cell housing.

17. The pressure measuring cell according to claim 13 further comprising a decoupling member disposed between the electric pressure sensor and said plastic measuring cell housing.

18. The pressure measuring cell according to claim 17 wherein said decoupling member is molded into the plastic measuring cell housing.

19. The pressure measuring cell according to claim 13 wherein said reinforcement plate member is molded into the plastic measuring cell housing.

\* \* \* \* \*